(12) United States Patent
Bammert et al.

(10) Patent No.: US 8,560,175 B2
(45) Date of Patent: Oct. 15, 2013

(54) METHOD AND DEVICE FOR ASSISTING A DRIVER OF A VEHICLE IN EXITING FROM A PARKING SPACE

(75) Inventors: Jens Bammert, Stuttgart (DE); Nicolas Jecker, Esslingen (DE); Simon Kossmann, Weissach (DE); Vsevolod Vovkuschevsky, Beitigheim-Bissingen (DE); Klaus Hoffsommer, Beitigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 362 days.

(21) Appl. No.: 12/933,025

(22) PCT Filed: Mar. 28, 2009

(86) PCT No.: PCT/EP2009/002287
§ 371 (c)(1),
(2), (4) Date: Nov. 12, 2010

(87) PCT Pub. No.: WO2009/121534
PCT Pub. Date: Oct. 8, 2009

(65) Prior Publication Data
US 2011/0054739 A1 Mar. 3, 2011

(30) Foreign Application Priority Data

Apr. 3, 2008 (DE) .................. 10 2008 017 030
May 27, 2008 (DE) .................. 10 2008 025 219

(51) Int. Cl.
*B62D 15/02* (2006.01)
*B60W 30/06* (2006.01)
(52) U.S. Cl.
USPC .......................................... 701/41; 701/301

(58) Field of Classification Search
None
See application file for complete search history.

(56) References Cited

U.S. PATENT DOCUMENTS

2007/0146164 A1 * 6/2007 Schmid et al. ............. 340/932.2
2008/0009990 A1 * 1/2008 Katoh et al. .................... 701/36

FOREIGN PATENT DOCUMENTS

DE         43 33 112 A1    3/1995
DE    10 2005 058498 A1    6/2007

OTHER PUBLICATIONS

International Search Report issued in PCT/EP2009/002287, mailed on Jul. 2, 2009, with translation, 4 pages.

* cited by examiner

*Primary Examiner* — Michael J Zanelli
(74) *Attorney, Agent, or Firm* — Osha Liang LLP (57) ABSTRACT

A method for assisting a vehicle driver in exiting from a lateral parking space in a longitudinal direction with respect to a roadway is disclosed. The method involves measuring at least the length of the parking space to obtain measurement data, determining a parking-space-exiting trajectory at least on the basis of the measurement data, starting a process of exiting the parking space, and carrying out the process of exiting the parking space with simultaneous collision prevention by monitoring a distance from a plurality of objects which bound the parking space. During the exiting process, the steering of the vehicle is controlled automatically, and the automatic control of the steering concludes when the vehicle has reached an intermediate position from which the vehicle can exit the parking space using a single maneuver. The method concludes as soon as the parking-space-exiting trajectory allows for collision-free exiting from the parking space.

21 Claims, 4 Drawing Sheets

METHOD AND DEVICE FOR ASSISTING A DRIVER OF A VEHICLE IN EXITING FROM A PARKING SPACE

BACKGROUND OF THE INVENTION

The invention relates to a method and to a device for assisting a driver of a vehicle in exiting from a parking space.

Known driving assistance devices for assisting a driver of a vehicle in parking, referred to below as parking systems for short, actively assist the driver in entering a parking space longitudinally with respect to a roadway. In this context, the parking system measures a possible parking space with sensors which are mounted laterally on the vehicle, calculates a parking trajectory from the parking space data, and steers the vehicle into the parking space through active steering intervention. During the parking process, the distance from objects which bound the parking space is monitored by ultrasonic sensors (Ultrasonic Park Assist Sensors—UPA sensors).

By means of parking systems it is possible for vehicles to be parked in very small parking spaces longitudinally with respect to the roadway. This makes the parking-space-exiting process difficult, in particular if the length of the parking space has become shorter during the period for which the vehicle was parked, for example, due to changing of vehicles which bound the parking space to the front and/or rear.

The object of the invention can therefore be considered to be to develop a method and a device for assisting a driver of a vehicle in removing a vehicle from a lateral parking space in a longitudinal direction with respect to a roadway.

SUMMARY OF THE INVENTION

The disadvantages of the prior art are avoided in a method according to the invention for assisting a driver of a vehicle in exiting from a lateral parking space in a longitudinal direction with respect to a roadway by virtue of the fact that in a first method step the method is started, for example, by activating a parking-space-exiting system or a driving assistance device when a parking space is to be exited longitudinally with respect to a roadway.

Then, in a second method step the length of the parking space is measured, for example by virtue of the fact that the parking-space-exiting system uses UPA sensors to measure the distances from objects which bound the parking space at the front and the rear, and determines therefrom the length of the parking space which is present. By using the UPA sensors at the front it is also possible to determine or estimate the width of the object which bounds the parking space to the front, from which determination or estimation the front depth of the parking space can be acquired. If it is not possible to estimate the width, a standard width or a standard depth of parking space is preferably assumed. Furthermore, the oblique position of the vehicle with respect to the objects which bound the parking space can be determined from the distance information of the UPA sensors relating to an object which bounds the parking space to the front and to the rear.

Furthermore, with these additional sensors or on the basis of information which is also known from the parking process it is possible to determine the distance of the vehicle from an object which bounds the parking space laterally, for example from the edge of the curb. In a third method step, at least on the basis of the acquired information relating to the length of the parking space, but preferably additionally also on the basis of the information relating to the depth of the parking space and/or to the oblique position of the vehicle and/or the possibly present distance of the vehicle from an object which laterally bounds the parking space, an optimum parking-space-exiting strategy is determined by calculating a parking-space-exiting trajectory on the basis of the data acquired by means of the measurement. This optimum parking-space-exiting strategy is preferably implemented by means of a parking-space-exiting trajectory which has, for example, one or more straight and/or arcuate sections and which preferably requires a minimum number of straight and/or arcuate forward maneuvers and/or rearward maneuvers referred to for short as parking-space-exiting maneuvers, which are formed by the individual sections. In this context it is additionally possible to detect whether a parking-space-exiting process is at all possible.

Then, in a fourth method step, the parking-space-exiting process is started, for example by outputting a corresponding signal to the driver of the vehicle indicating that a parking-space-exiting trajectory is calculated and is available. In a fifth method step, the parking-space-exiting process is carried out with simultaneous collision prevention by monitoring the distance from at least objects which bound the parking space. In this context it may be possible for the driver to bring about the travel direction of the first parking-space-exiting maneuver, for example by means of a steering lock or by predefining a steering angle. In such a case, the parking-space-exiting trajectory is then newly calculated or adapted. Furthermore, the front UPA sensors can be used for an unobstructed view check during the forward maneuver, with the result that if there is an unobstructed view, that is to say if an object which bounds the parking space to the front can be passed laterally without a collision, the parking-space-exiting process can be ended. Likewise it is possible to provide that the position of the vehicle in the parking space is determined and the steering of the vehicle is controlled automatically. Alternatively it is conceivable to inform the driver about the necessary parking-space-exiting maneuvers by means of driving instructions. The driver of the vehicle is preferably responsible for the acceleration and braking of the vehicle and for the monitoring of the flowing traffic during the entire parking-space-exiting process. In a sixth method step, the method is ended as soon as collision-free exiting from the parking space is possible, for example, with a single remaining parking-space-exiting maneuver. As soon as collision-free exiting from the parking space is possible, the driver is informed of this and the driver assumes control of the vehicle.

During the exiting from the parking space, the steering of the vehicle is preferably controlled automatically, wherein the method for automatically controlling the steering is carried out only until the vehicle has reached an intermediate position from which it can exit the parking space with a remaining maneuver, in particular forward maneuver, without a collision. The driver is then informed that this intermediate position has been reached and the steering is released for activation by the driver.

During the remaining maneuver, the vehicle preferably moves here with a constant steering angle along a circular path. The steering angle which is necessary for this can also be set automatically here before the release by virtue of the fact that, in the intermediate position, the steering is still turned automatically into a parking-space-exiting position which permits collision-free exiting from the parking space in one maneuver. The parking-space-exiting position can preferably correspond here to the maximum or approximately maximum lock of the steering system. Alternatively, it would, however, also be possible for the device to calculate and set the smallest possible steering lock which still permits collision-free exiting from the parking space in one maneuver.

The transfer of the steering to the driver therefore still takes place within the parking space, with the result that during the exiting from the parking space and subsequent feeding into the roadway located next to the parking space the vehicle is steered by the driver himself. However, the method for exiting from a parking space can furthermore be designed also to assist the driver in this phase of the exiting from the parking space by virtue of the fact that the steering angle which has been set and/or the path which has been traveled along is monitored by means of a travel sensor and the method of odometry, and when an imminent collision of the vehicle with an obstacle is detected, a corresponding warning signal is conveyed to the driver. The parking-space-exiting process therefore comprises a first phase, in which the steering of the vehicle is activated automatically and the vehicle is moved into an intermediate position from which exiting from the parking space with a remaining maneuver is possible, and a subsequent second phase, in which the steering has to be activated by the driver in order to move the vehicle out of the parking space. In this second phase, the driver can be assisted by a corresponding monitoring and warning function.

During the parking-space-exiting process the vehicle can be automatically accelerated and/or braked, for example by intervention of an engine controller or a brake system of the vehicle, wherein the automatic acceleration and/or braking take place only until the vehicle has reached its intermediate position from which it is possible to exit the parking space in a remaining single maneuver. As a result, the driver is also assigned braking control and throttle control while he is still within the parking space.

One particularly advantageous embodiment of the method according to the invention provides that the parking-space-exiting trajectory has a straight section which forms a first, straight rearward maneuver and whose end position is adjoined by a first arcuate section which moves the vehicle out of the parking space and forms a first forward maneuver. As a result, during the first rearward maneuver, a collision with a curb and as a result possible damage to a wheel or tire of the vehicle are avoided.

If no curb data are available, for example because the parking process which has led to a present parking situation has been carried out without a parking system, curb data directly on the vehicle are preferably used for the calculation, i.e. the method and the driving assistance device assume during the determination of the parking-space-exiting trajectory that the vehicle has been parked directly against a curb edge. Curb data which are stored by a parking process are preferably also used for the determination of the parking-space-exiting trajectory.

According to one advantageous embodiment of the invention, the curb is detected directly during the parking-space-exiting process, and, if appropriate, the parking-space-exiting trajectory is corrected in such a way that the parking-space-exiting trajectory is traveled along without collisions with the curb. During the determination of the parking-space-exiting trajectory, it is preferably detected at the same time whether a parking-space-exiting process is at all possible.

One particularly advantageous embodiment of the invention provides that while the parking-space-exiting process is being carried out, the vehicle is maneuvered out of the parking space along the parking-space-exiting trajectory by means of an automatic steering intervention, for example by means of an active steering intervention by a driving assistance device.

One advantageous embodiment of the invention provides that while the parking-space-exiting process is being carried out, the driver of the vehicle is responsible for accelerating and braking the vehicle and for monitoring the flowing traffic.

When the method ends, the driver is preferably informed of this and assumes control of the vehicle.

In order also to be able to exit parking spaces which are so short that their length would not be sufficient, or would be too small, to accommodate the diagonal of the vehicle, it is possible, when exiting a parking space, to move the vehicle in parallel by moving the vehicle in one or more alternating forward maneuvers and rearward maneuvers along individual S-shaped sections of the parking-space-exiting trajectory until an intermediate position is assumed or reached from which collision-free exiting from the parking space, for example with a single remaining maneuver, is possible. For this purpose, subsequent to the measurement in a method step, a multi-maneuver parking-space-exiting trajectory, having one or more S-shaped sections, is calculated as a function of at least the length of the parking space, wherein each S-shaped section, which alternately forms a forward maneuver or rearward maneuver, causes a vehicle which, in a fourth method step, is steered along the parking-space-exiting trajectory and travels along the parking-space-exiting trajectory to move bit by bit parallel to the direction of the roadway in the parking space by respectively steering in one direction and then in the opposite direction. This is achieved by virtue of the fact that a vehicle which is steered along an S-shaped section comes to a standstill parallel to the parking space or to its original parked position in each case at the start of each S-shaped section and at the end of each S-shaped section, that is to say at the change from each forward maneuver to each rearward maneuver, and vice versa. The method is then ended as soon as the vehicle assumes an intermediate position at the end of an S-shaped section which is preferably carried out as a rearward maneuver, from which intermediate position the vehicle can preferably leave the parking space without a collision in a single last maneuver and cut into the roadway.

The calculation of the parking-space-exiting trajectory which comprises an S-shaped section is then preferably carried out when the result of the measurement is that oblique positioning of the vehicle in the parking space which is necessary to leave the parking space is impossible.

One advantageous embodiment of the method according to the invention provides that if the result of the measurement is that at least the length of the parking space is not sufficient, or the length of the parking space is too small, for exiting from the parking space in one maneuver or in a rearward maneuver and a subsequent forward maneuver, an intermediate position, which is offset parallel to the parked position and from which collision-free exiting from the parking space, for example with a single remaining maneuver, is possible, or from which the vehicle can exit the parking space in preferably one maneuver, is calculated in the method step, and subsequently a multi-maneuver parking-space-exiting trajectory, which has S-shaped sections and which leads from the original parked position into the intermediate position in one or more maneuvers with parallel movement of the vehicle, is calculated.

The parking-space-exiting trajectory is preferably calculated in such a way that the intermediate position is reached with an S-shaped section which is carried out as a last rearward maneuver, with the result that the ultimate exiting from the parking space can take place in one forward maneuver.

One advantageous refinement of the invention provides that in addition the width or depth of the parking space is measured, and/or the position of objects which bound the parking space to the front and the rear on the roadway side is measured. Such objects may be, for example, the front and/or rear of vehicles which are parked to the rear and/or to the front of the parking space, or roadway-side corners of said vehicles. The width or depth of the parking space is subsequently taken into account in the calculation of the intermediate position. As a result, the calculation of the intermediate position takes into account how far the objects which bound the parking space project into the roadway, with the result that the actual depth of the parking space in the driving-out direction can be taken into account in the calculation of the intermediate position. If another parked vehicle which bounds the parking space to the front is, for example, located right next to the curb, the intermediate position can be reached earlier than, for example, in the case of a vehicle which is parked far away from the curb and bounds the parking space, for example, to the front.

If there is no provision for the intermediate position to be calculated in a method, during the travel along the parking-space-exiting trajectory, in each case sensing of the surroundings preferably takes place at least in the end positions of the S-shaped sections, which sensing of the surroundings serves to check whether the vehicle can exit the parking space from the instantaneous position without a collision and preferably in a single, last maneuver. The sensing of the surroundings serves here to sense, in particular, objects which bound the parking space in particular to the front and/or to the rear, for example by means of distance measurements using, for example, ultrasonic sensors or UPA sensors. The sensing of the surroundings can also be carried out continuously during the travel along the parking-space-exiting trajectory.

The fact that between the third and the fourth method steps the starting of the parking-space-exiting process takes place, for example by outputting a corresponding signal to the driver of the vehicle indicating that a parking-space-exiting trajectory is calculated and present.

The fact that the parking-space-exiting process is carried out with simultaneous collision prevention by monitoring the distance from at least objects which bound the parking space.

One particularly advantageous embodiment of the invention provides that, preferably after a warning has been output to the driver indicating that an intermediate position from which the parking space can be exited in a single last maneuver without a collision has now been reached, the vehicle is moved along a section of the parking-space-exiting trajectory which carries out or describes this last maneuver.

One particularly advantageous embodiment of the method according to the invention provides that the parking-space-exiting trajectory has a first straight section which forms a straight rearward maneuver and whose end position is adjoined by a first S-shaped section which moves the vehicle laterally in parallel in the parking space and forms a first forward maneuver. As a result, during the first rearward maneuver collision with a curb and as a result possible damage to a wheel or tire of the vehicle are avoided.

If no curb data are available, for example because the parking process which has led to a current parking situation has been carried out without a parking system, curb data directly on the vehicle are preferably used for the calculation, i.e. the method and the driving assistance device assume during the determination of the parking-space-exiting trajectory that the vehicle has been parked directly against a curb edge. Curb data which are stored by a parking process are preferably also used for the determination of the parking-space-exiting trajectory.

According to one advantageous embodiment of the invention, the curb is detected directly during the travel along the parking-space-exiting trajectory, and, if appropriate, the parking-space-exiting trajectory is corrected in such a way that the parking-space-exiting trajectory is traveled along without collisions with the curb.

During the determination of the parking-space-exiting trajectory it is preferably simultaneously detected whether it is possible to travel along an S-shaped section of a parking-space-exiting trajectory at all.

One particularly advantageous embodiment of the invention provides that while the parking-space-exiting process is being carried out, the vehicle is maneuvered along the parking-space-exiting trajectory out of the original parked position into the intermediate position in the parking space by means of an automatic steering intervention, for example by means of an active steering intervention of a driving assistance device.

One advantageous embodiment of the invention provides that while the parking-space-exiting process is being carried out, the driver of the vehicle is responsible for accelerating and braking the vehicle and for monitoring the flowing traffic.

When the method ends, the driver is preferably informed of this and assumes control of the vehicle.

The invention can be advantageously used in particular in conjunction with a driving assistance device for assisting a driver of a vehicle in exiting from a lateral parking space in a longitudinal direction with respect to a roadway. Such a driving assistance device preferably comprises means for measuring and sensing objects which bound a parking space, and a microprocessor which is connected to the means and has associated storage means for calculating a parking-space-exiting trajectory for removing a vehicle from the lateral parking space, and means for carrying out the parking-space-exiting process. The means for carrying out the parking-space-exiting process may be, for example, a suitable display in the dashboard which represents steering locks which are necessary, for example, for traveling along the parking-space-exiting trajectory and/or driving movements and/or driving directions, and/or means for carrying out an active steering intervention and/or means for carrying out active vehicle movements. The means for measuring and sensing objects which bound a parking space preferably simultaneously monitor the distance from objects which at least bound the parking space during the parking-space-exiting process in order to simultaneously prevent collisions.

One advantageous application of the method according to the invention arises in conjunction with a driving assistance device which permits guided exiting from a parking space or semi-automatic exiting from a parking space or fully automatic exiting from a parking space.

BRIEF DESCRIPTION OF THE DRAWINGS

The invention will be explained below with reference to the drawings, in which.

DETAILED DESCRIPTION

The invention is based on a driving assistance device which is referred to below for short as parking-space-exiting system and carries out a method according to the invention for assisting a driver of a vehicle 01 in exiting from a lateral parking space 02 in a longitudinal direction with respect to a roadway, and which determines an optimum parking-space-exiting strategy of a blocked-in, parked vehicle and maneuvers the driver of the vehicle 01 out of the parking space 02 by means of, for example, an active steering intervention.

If a parking space 02 is to be exited longitudinally with respect to the roadway, the method is started in a first method step by activating the parking-space-exiting system.

Figure 1:
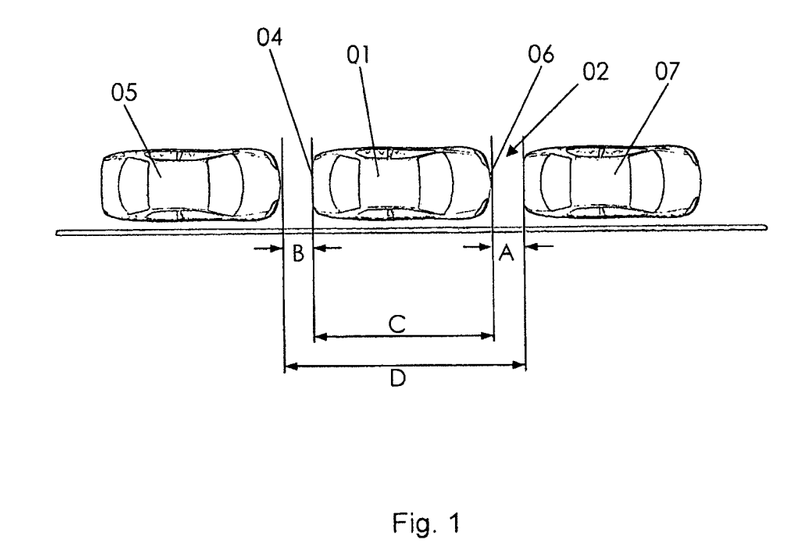
FIG. 1 shows a schematic illustration of a first parking situation.

In a second method step, the length of the parking space 02 is measured by, for example, the parking-space-exiting system using, as illustrated in FIG. 1, UPA sensors to measure the distances A, B from objects 07, 05 which bound the parking space 02 to the front and to the rear, for example to determine the parking space 02 with respect to a vehicle 07, 05 which is parked bounded to the front and the rear, and said system determines therefrom the length D of the present parking space in conjunction with the known length C of the vehicle.

Figure 2:
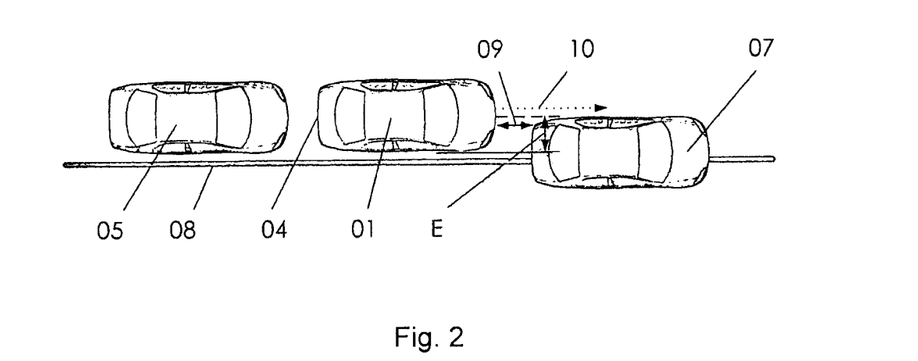
FIG. 2 shows a schematic illustration of a second parking situation.

By using the front UPA sensors 09, 10 it is also possible, as illustrated in FIG. 2, to estimate the width of the object 07 which bounds the parking space to the front, said object being in FIG. 2 a vehicle 07 which is parked partially on a curb 08, and the front depth E of the parking space can be acquired from said estimate. In FIG. 2, a UPA sensor 09 which is arranged at the front 06 of the vehicle on the front seat passenger's side indicates a distance from the vehicle 07, while the UPA sensor 10 which is arranged at the front 06 of the vehicle on the side facing the roadway, or the driver's side, has an unobstructed view and does not indicate a distance. As a result, the depth E of the parking space can be at least roughly estimated. If it is not possible to estimate the width, a standard width or standard parking space depth is preferably assumed.

Figure 3:
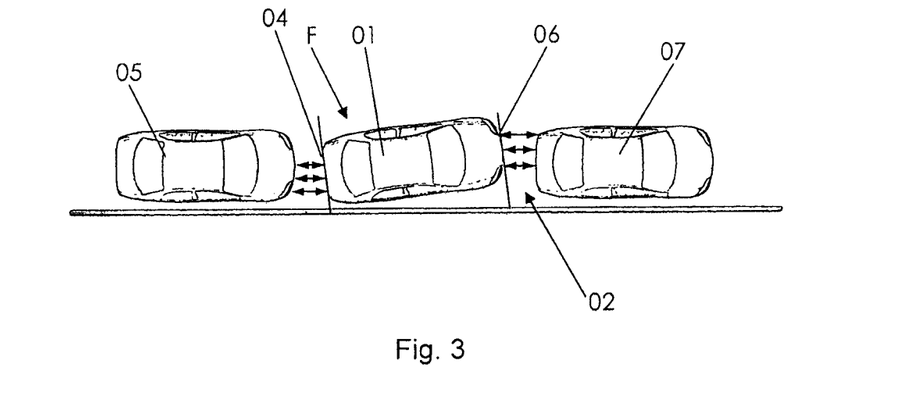
FIG. 3 shows a schematic illustration of a third parking situation.

Furthermore, as illustrated in FIG. 3, the oblique position of the vehicle 01 with respect to the objects 05, 07 which bound the parking space 02 can be determined from the distance information of different UPA sensors with respect to an object 05 which bounds the parking space 02 to the front 07 or to the rear.

Figure 4:
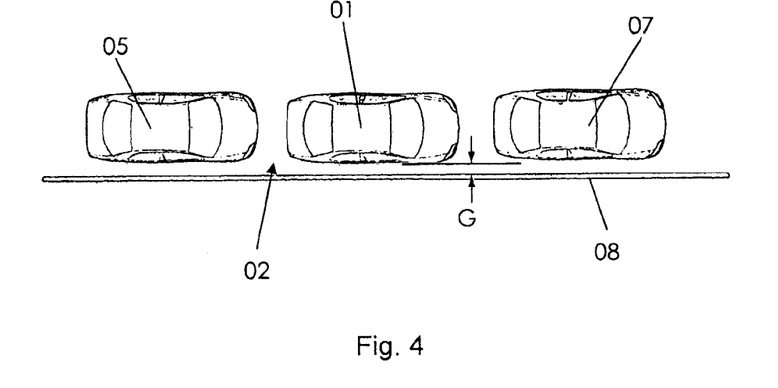
FIG. 4 shows a schematic illustration of a fourth parking situation.

Moreover, by means of additional sensors or on the basis of information which is also known from the parking process it is possible to determine the distance of the vehicle 01 from an object 08 which bounds the parking space laterally, for example from a curb edge 08 (FIG. 4). For example, the distance G from the curb edge 08 can be determined by means of an additional sensor with a low installation height. If curb data are not available, for example because the parking process which has led to the present parking situation was carried out without a parking system, curb data directly on the vehicle are preferably used for the calculation, i.e. the method and the driving assistance device assume that the vehicle 01 has been parked directly against a curb edge 08.

In a third method step, on the basis of the acquired information about the length D of the parking space, but preferably also on the basis of the information about the depth E of the parking space and/or the oblique positioning F of the vehicle 01 and/or the possible present distance G of the vehicle 01 from an object 08 which laterally bounds the parking space 02, an optimum parking-space-exiting strategy is determined by calculating a parking-space-exiting trajectory 03 on the basis of the data which have been acquired by means of the measurement (FIGS. 5 to 8). This optimum parking-space-exiting strategy is preferably implemented by means of a parking-space-exiting trajectory 03 which has, for example, one or more straight and/or arcuate sections, which parking-space-exiting trajectory 03 preferably requires a minimum number of straight and/or arcuate forward maneuvers and/or rearward maneuvers, parking-space-exiting maneuvers for short, which are formed by the individual sections. In this context it is simultaneously possible to detect whether a parking-space-exiting process is at all possible.

In a fourth method step, the parking-space-exiting process, if such a parking-space-exiting process is possible, is started. This is done, for example, by outputting a corresponding signal to the driver of the vehicle 01 indicating that a parking-space-exiting trajectory 03 is calculated and is available. This signal can comprise, for example, a simple instruction, for example to steer in a specific direction, and to move forward or rearward, depending on the parking situation, for example in the form of a display in the dashboard.

In a fifth method step, the parking-space-exiting process is carried out with simultaneous collision prevention by monitoring the distance A, B from at least objects 07, 05 which bound the parking space 02 (FIGS. 5 to 8). This is done, for example, by the parking-space-exiting system preferably actively assuming the steering of the vehicle 01, and the parking-space-exiting system simultaneously monitoring the distances B, A or the distance from objects 05, 07 which bound the parking space 02. A display in the dashboard is generally also conceivable here, which display the driver has to follow in order to follow the parking-space-exiting trajectory 03. In this context it is possible that the driver will bring about the direction of travel of the first parking-space-exiting maneuver by means of, for example, a steering lock or by predefining a steering angle. In such a case, the parking-space-exiting trajectory 03 is then preferably newly calculated or adapted. Moreover, the front UPA sensors can be used for an unobstructed view check during the forward maneuver, with the result that if there is an unobstructed view, that is to say if an object 07 which bounds the parking space 02 to the front can be passed laterally without a collision, the parking-space-exiting process can be ended. Likewise it is possible to provide that the position of the vehicle 01 in the parking space 02 is determined and the steering of the vehicle 01 is automatically controlled. Alternatively it is conceivable to inform the driver about the necessary parking-space-exiting maneuvers by means of driving instructions.

In a sixth method step, the method is ended as soon as collision-free exiting from the parking space 02, for example with a single remaining parking-space-exiting maneuver, is possible. The parking-space-exiting system preferably informs the driver about this, after which said driver assumes control of the vehicle 01.

The driver of the vehicle 01 is preferably responsible for accelerating and braking the vehicle 01 and for monitoring the flowing traffic during the entire parking-space-exiting process.

The conceivable parking-space-exiting strategies are preferably dependent on the parking situation or on the parking space geometry. Different parking-space-exiting strategies will be explained in more detail below with reference to FIGS. 5 to 9.

Figure 5:
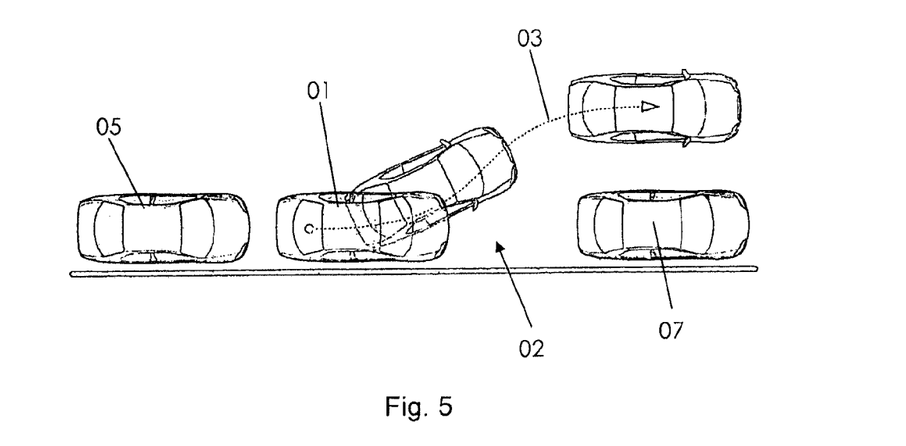
FIG. 5 shows a schematic illustration of a first parking-space-exiting strategy.

FIG. 5 shows a parking situation or a parking-space-exiting strategy in which the vehicle 01 can exit the parking space 02 with a first forward maneuver. In the situation illustrated in FIG. 5, the parking-space-exiting system determines, from the length D of the parking space and the distances A, B, G, a parking-space-exiting strategy with a parking-space-exiting trajectory 03 along which the vehicle can exit the parking space 02 with a single parking-space-exiting maneuver. The single first parking-space-exiting maneuver leads out of the parking space 02 here along the parking-space-exiting trajectory 03 with a minimum necessary steering lock and without a collision. The parking-space-exiting system steers the vehicle on the minimum necessary steering angle which is necessary in order to leave the parking space 02 without a collision, and informs the driver about the ending of the parking-space-exiting assistant as soon as the steering angle is reached.

Figure 6:
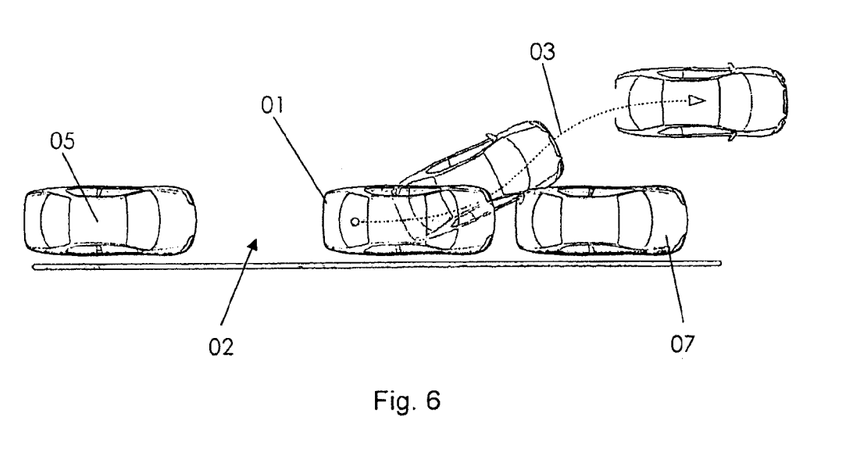
FIG. 6 shows a schematic illustration of a second parking-space-exiting strategy.

FIG. 6 shows a parking situation or a parking-space-exiting strategy in which the vehicle 01 cannot exit the parking space 02 with a first forward maneuver. The parking situation is at a comparatively short distance A from an object 07 which bounds the parking space 02 to the front, and at a comparatively large distance B from an object 05 which bounds the parking space 02 to the rear. In this parking situation, the vehicle 01 can only exit the parking space 02 in a forward maneuver which is subsequent to a first rearward maneuver. In this context, the parking-space-exiting system determines, from the length of the parking space and the distances from the objects 05, 07 which bound the parking space 02, a parking-space-exiting strategy with a parking-space-exiting trajectory 03 which has two maneuvers or two sections, with the result that the parking space can be exited in two parking-space-exiting maneuvers. The first parking-space-exiting maneuver which is carried out as a rearward maneuver leads here straight back along the first section (not illustrated in FIG. 6) of the parking-space-exiting trajectory 03 up to a distance from the object 05 which bounds the parking space 02 to the rear, at which distance UPA sensors arranged at the rear 04 of the vehicle indicate a warning before a minimum distance is undershot, for example by outputting a continuous tone. A subsequent second parking-space-exiting maneuver which is carried out as a forward maneuver leads out of the parking space 02 with the minimum required steering angle. In the forward maneuver, the parking-space-exiting system steers the vehicle onto the minimum necessary steering angle which is necessary to exit the parking space 02 without a collision, and informs the driver about the ending of the parking-space-exiting assistant as soon as the steering angle is reached.

Figure 7:
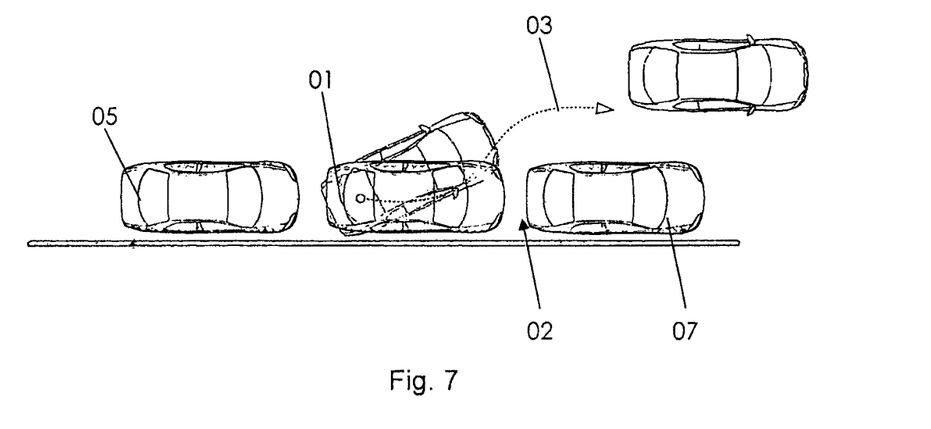
FIG. 7 shows a schematic illustration of a third parking-space-exiting strategy.

FIG. 7 shows a parking situation or a parking-space-exiting strategy in which the vehicle 01 cannot exit the parking space 02 either with a first forward maneuver or with a forward maneuver after a first rearward maneuver. The parking situation is at a short distance A from an object 07 which bounds the parking space 02 to the front and at an at most slightly larger distance B from an object 05 which bounds the parking space 02 to the rear. In this parking situation, the vehicle 01 cannot exit the parking space 02 either in a first forward maneuver or in a forward maneuver which is directly subsequent to a first rearward maneuver. The parking-space-exiting system determines here, from the length of the parking space and the distances from the objects 05, 07 which bound the parking space 02, a parking-space-exiting strategy with a parking-space-exiting trajectory 03 which has a plurality of maneuvers or N sections, with the result that the parking space can be exited in N parking-space-exiting maneuvers. The first parking-space-exiting maneuver which is carried out as a rearward maneuver leads back here in an arcuate shape along the first section (not illustrated in FIG. 7) of the parking-space-exiting trajectory 03 with maximum right-handed lock of the steering, up to a distance from the object 05 which bounds the parking space 02 to the rear at which UPA sensors which are arranged at the rear 04 of the vehicle issue a warning about undershooting of a minimum distance, for example by outputting a continuous tone. A subsequent second parking-space-exiting maneuver which is carried out as a forward maneuver leads forward in an arcuate shape with a maximum left-hand steering lock up to a distance from the object 07 which bounds the parking space 02 to the front at which UPA sensors which are arranged at the front 06 of the vehicle issue a warning about undershooting of a minimum distance, for example by outputting a continuous tone. The two parking-space-exiting maneuvers are repeated until collision-free exiting from the parking space 02 is possible in a last forward maneuver with a minimum steering angle of the steering. As a result, the vehicle 01 experiences, with each rearward maneuver and forward maneuver, an increasingly oblique position in the parking space 02, extending as far as an oblique position from which it is possible to exit the parking space 02 in a last forward maneuver. In this last forward maneuver, the parking-space-exiting system steers the vehicle onto the minimum necessary steering angle which is necessary to exit the parking space 02 without a collision, and informs the driver about the ending of the parking-space-exiting assistant as soon as the steering angle is reached.

Figure 8:
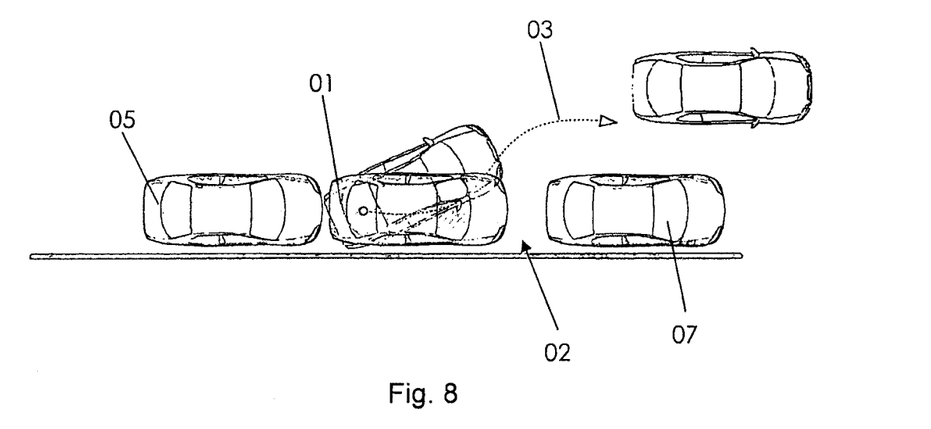
FIG. 8 shows a schematic illustration of a fourth parking-space-exiting strategy.

FIG. 8 shows a parking situation or a parking-space-exiting strategy in which the vehicle 01 cannot exit the parking space 02 either with a first forward maneuver or with a forward maneuver after a first rearward maneuver. The parking situation is at a comparatively large distance A from an object 07 which bounds the parking space 02 to the front and at a short distance B from an object 05 which bounds the parking space 02 to the rear. In this parking situation, the vehicle 01 cannot exit the parking space 02 either in a first forward maneuver or in a forward maneuver which is directly subsequent to a first rearward maneuver. The parking-space-exiting system determines here, from the length of the parking space and the distances from the objects 05, 07 which bound the parking space 02, a parking-space-exiting strategy with a parking-space-exiting trajectory 03 which has multiple maneuvers or N sections, with the result that the parking space can be exited in N parking-space-exiting maneuvers. The first parking-space-exiting maneuver which is carried out as a forward maneuver leads here to the front in an arcuate shape along the first section (not illustrated in FIG. 8) of the parking-space-exiting trajectory 03 with a maximum left-handed steering lock up to a distance from the object 07 which bounds the parking space 02 to the front at which UPA sensors which are arranged at the front 06 of the vehicle issue a warning about undershooting of a minimum distance, for example by outputting a continuous tone. A subsequent, second parking-space-exiting maneuver which is carried out as a rearward maneuver leads to the rear in an arcuate shape with a maximum right-handed lock of the steering, up to a distance from the object 05 which bounds the parking space 02 to the rear at which UPA sensors which are arranged at the rear 04 of the vehicle issue a warning about undershooting of a minimum distance, for example by outputting a continuous tone. The two parking-space-exiting maneuvers are repeated until collision-free exiting from the parking space 02 is possible in a last forward maneuver with a minimum steering angle of the steering. As a result, the vehicle 01 experiences, with each forward maneuver and rearward maneuver, an increasingly oblique position in the parking space 02, extending as far as an oblique position from which it is possible to exit the parking space 02 in a last forward maneuver. During this last forward maneuver, the parking-space-exiting system steers the vehicle onto the minimum necessary steering angle which is necessary in order to exit the parking space 02 without a collision, and informs the driver about the ending of the parking-space-exiting assistant as soon as the steering angle is reached.

It is important to stress that the distance warning is output when a specific safety minimum distance from another object, article or vehicle 05, 07 is undershot.

Figure 9:
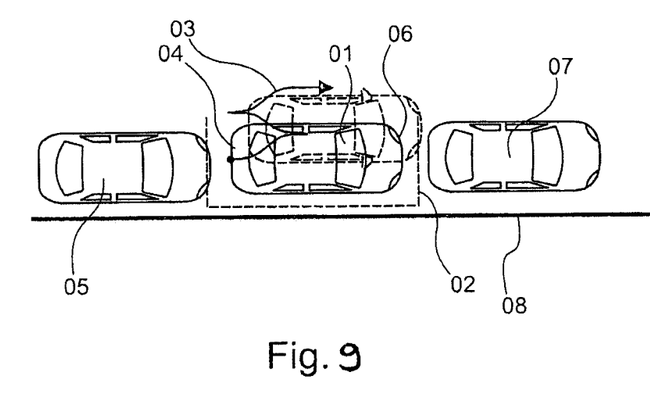
FIG. 9 shows a schematic illustration of a fifth parking-space-exiting strategy.

FIG. 9 shows a schematic illustration of a parking-space-exiting situation of exiting from a short lateral parking space, in which parking-space-exiting situation it is necessary for the vehicle to move laterally in parallel along a parking-space-exiting trajectory which has multiple maneuvers and multiple S-shaped sections, in order to reach an intermediate position from which collision-free exiting from the parking space with a single remaining maneuver is possible.

The invention is based on a driving assistance device which is referred to below for short as a parking-space-exiting system and which carries out a method according to the invention for assisting a driver of a vehicle 01 in exiting from a lateral parking space 02 in a longitudinal direction with respect to a roadway, which driving assistance device determines a parking-space-exiting strategy of a blocked-in, parked vehicle and maneuvers the driver of the vehicle 01 out of the parking space 02 by means of, for example, an active steering intervention. If a lateral parking space 02, which is located longitudinally with respect to a roadway, is to be exited, in a first method step the method is started by activating the parking-space-exiting system.

In a second method step, the length of the parking space 02 is measured by, for example, the parking-space-exiting system measuring the present length of the parking space 02 using UPA sensors. If the result of the measurement is that the parking space 02 in which the vehicle 01 is located in its parked position is now so short, for example due to changing of parking vehicles 05, 07 which bound the parking space 02 to the front and/or to the rear, that it is impossible to obliquely position the vehicle 01 in the parking space 02 as is necessary to exit the parking space 02, which oblique position would be necessary, for example, for simple exiting from the parking space, for example with just one straight or arcuate rearward maneuver and one arcuate forward maneuver, in a third method step a parking-space-exiting trajectory 03 which has at least one S-shaped section is calculated on the basis of the parking space data which acquired by means of the measurement, and preferably on the basis of curb data which have also been stored by a parking process, wherein each S-shaped section, which alternately forms a forward maneuver or rearward maneuver, causes a vehicle 01 which is steered along the parking-space-exiting trajectory 03 to move parallel to the direction of the roadway in the parking space 02 by virtue of the fact that the vehicle 01 comes to a standstill parallel to the parking space 01 or to its original parked position, in each case at the start of each S-shaped section and at the end of each S-shaped section. It is preferably simultaneously detected here whether travel along an S-shaped section of a parking-space-exiting trajectory 03 is at all possible. If curb data are not available, for example because the parking process which has led to the present parking situation was carried out without a parking system, curb data directly on the vehicle 01 are preferably used for the calculation, i.e. the method and the driving assistance device assume that the vehicle 01 has been parked directly against a curb edge 08.

In a fourth method step, parallel movement of the vehicle 01 takes place by traveling along the parking-space-exiting trajectory 03. The travel is started, for example, by outputting a corresponding signal to the driver of the vehicle 01 as soon as a parking-space-exiting trajectory 03 is calculated and is available. This signal can comprise, for example, a simple instruction, for example for forward travel or rearward travel, depending on the parking situation, for example in the form of a display in the dashboard.

The travel is subsequently carried out with simultaneous collision prevention. This is done, for example, by the parking-space-exiting system preferably actively assuming the steering of the vehicle 01, and the parking-space-exiting system simultaneously monitoring the distances or distance from objects 05, 07 which bound the parking space 02. Generally, a display in the dashboard is also conceivable here, which display the driver has to follow in order to follow the parking-space-exiting trajectory 03.

In a fifth method step, the method is ended as soon as the vehicle 01 assumes or reaches an intermediate position from which collision-free exiting from the parking space 02 is possible preferably in just still one single maneuver. The parking-space-exiting system preferably informs the driver about this, after which said driver assumes control of the vehicle 01.

The method is also ended if the result of the measurement is that oblique positioning of the vehicle 01 in the parking space 02 as is necessary to exit the parking space 02 is possible.

The driver of the vehicle 01 is preferably responsible for accelerating and braking the vehicle 01 and for monitoring the flowing traffic during the entire parking-space-exiting process. The curb 08 and the curb edge 08 can be detected directly during the parking-space-exiting process by additional sensors on the vehicle 01. It is also conceivable to store curb data which have been acquired during a parking process.

A parking-space-exiting system which carries out a method according to the invention determines a parking-space-exiting trajectory 03 in the situation of a small parking space 02 which is illustrated in FIG. 9, with the result that the parking space 02 can be exited after N maneuvers or by means of N maneuvering moves. The first maneuver can, for example, lead straight back until, for example, UPA sensors which are arranged at the rear 04 of the vehicle output a distance warning, for example issued by means of a continuous tone, relating to an article, object or vehicle 05 which bounds the parking space 02 to the rear. Moreover, moving straight back avoids contact with the curb 08. The second maneuver extends, with full left-handed locking of the steering or with full turning of the steering, to the deflection point of the first S-shaped section of the parking-space-exiting trajectory 03 and then continues, with full right-handed locking of the steering or with full steering in the opposite direction, until, for example, UPA sensors which are arranged at the rear 06 of the vehicle output a distance warning, indicated, for example, by a continuous tone, relating to an article, object or vehicle 07 which bounds the parking space 02 to the front. After the S-shaped section has been traveled along, the vehicle 01 is again located parallel to the original parked position in the parking space 02. The third maneuver extends in turn to the rear, while during the third maneuver the parking-space-exiting system can carry out steering movements, since contact with the curb can be excluded because of the preceding movement of the vehicle during the second maneuver. The third maneuver therefore extends along the second S-shaped section of the parking-space-exiting trajectory 03. The third maneuver is in turn carried out until a distance warning is output.

After the third maneuver, the second and third maneuvers are repeated for so long and so often until an intermediate position is reached from which collision-free exiting from the parking space 02 with a last maneuver is possible. From the time when the intermediate position is reached, the parking-space-exiting system is deactivated, and the driver is informed of this, for example by means of a warning tone, a display in a display unit or by the lighting up or extinguishing of a lamp.

It is important to emphasize that the distance warning is output when a specific safety minimum distance from another object, article or vehicle 05, 07 is undershot.

The invention claimed is:

1. A method for assisting a driver of a vehicle in exiting from a lateral parking space in a longitudinal direction with respect to a roadway, wherein the parking method takes place without driver intervention, the method comprising:
when a parking space is to be exited longitudinally with respect to a roadway:
measuring at least the length of the parking space to obtain measurement data;
determining, by a computing device having a processor, a parking-space-exiting trajectory at least on the basis of the measurement data;
starting a process of exiting the parking space; and
carrying out, by the computing device having the processor, the process of exiting the parking space with simultaneous collision prevention by monitoring a distance from a plurality of objects which bound the parking space,
wherein the method concludes as soon as the parking-space-exiting trajectory allows for collision-free exiting from the parking space, and
wherein when the process of exiting the parking space is carried out, the steering of the vehicle is controlled automatically, and wherein the automatic control of the steering concludes when the vehicle has reached an intermediate position from which the vehicle can exit the parking space using a single maneuver.

2. The method as claimed in claim 1, wherein when the intermediate position is reached, the steering is turned automatically into a parking-space-exiting position that allows for collision-free exiting from the parking space.

3. The method as claimed in claim 2, wherein after the intermediate position has been reached during the exiting from the parking space, a steering angle which has been set and/or the path which has been traveled along is monitored, and when an imminent collision of the vehicle with the plurality of objects is detected, a corresponding warning signal is conveyed to the driver.

4. The method as claimed in claim 1, wherein during the parking-space-exiting process the vehicle is automatically accelerated and braked, wherein the automatic acceleration and braking concludes when the vehicle has reached an intermediate position from which the vehicle is able to exit the parking space using a single maneuver.

5. The method as claimed in claim 1, further comprising measuring a depth of the front parking space, and using the measured depth in the determination of the parking-space-exiting trajectory.

6. The method as claimed in claim 1, further comprising measuring an oblique position of the vehicle in the parking space, and using the measured oblique position in the determination of the parking-space-exiting trajectory.

7. The method as claimed in claim 1, further comprising measuring a distance of the vehicle from one of the plurality of objects which laterally bounds the parking space, and using the measured distance in the determination of the parking-space-exiting trajectory.

8. The method as claimed in claim 1, wherein curb data stored by a separate parking process is also used in the determination of the parking-space-exiting trajectory.

9. The method as claimed in claim 1, wherein a curb is detected directly during the process of exiting the parking space, and the parking-space-exiting trajectory is-corrected based on the detection of the curb so that the parking-space-exiting trajectory is traversed without collisions with the curb.

10. The method as claimed in claim 1, wherein the parking-space-exiting trajectory is newly determined when the driver brings about a travel direction of the single maneuver by means of a steering lock and/or by means of a gear speed selection.

11. The method as claimed in claim 1, further comprising performing an unobstructed view check at least during a forward maneuver, and when there is an unobstructed view and one of the plurality of objects which bounds the parking space to the front is passable laterally without a collision, the process of exiting the parking space is ended.

12. The method as claimed in claim 1, wherein, when the method ends, the driver is informed, after which said driver assumes control of the vehicle.

13. The method as claimed in claim 1, wherein the parking-space-exiting trajectory provides a plurality of arcuate forward maneuvers and a plurality of rearward maneuvers, as a result of which the vehicle experiences an increasingly oblique position in the parking space until collision-free exiting from the parking space is carried out in a last forward maneuver.

14. The method as claimed in claim 1, wherein a first parking-space-exiting maneuver is carried out as a rearward maneuver directed straight to a rear and which is adjoined by one or more arcuate forward maneuvers and rearward maneuvers.

15. The method as claimed in claim 1, further comprising:
calculating the parking-space-exiting trajectory comprising at least one S-shaped section, as a function of at least the length of the parking space, wherein each S-shaped section, which alternately forms a forward maneuver or a rearward maneuver, causes the vehicle steered along the parking-space-exiting trajectory to move parallel to the direction of the roadway in the parking space, wherein the vehicle comes to a standstill parallel to the parking space or to an original parked position in each case at a start of each S-shaped section and at an end of each S-shaped section, and parallel movement of the vehicle by traveling along the parking-space-exiting trajectory.

16. The method as claimed in claim 15, wherein the parking-space-exiting trajectory comprising the S-shaped section is calculated when the measurement taken results in an oblique positioning of the vehicle in the parking space that does not allow for leaving of the parking space.

17. The method as claimed in claim 15, wherein the parking-space-exiting trajectory is calculated in such a way that an intermediate position is reached with an S-shaped section which is carried out as a last rearward maneuver, with the result that an ultimate exit from the parking space occurs in a single forward maneuver.

18. The method as claimed in claim 15, wherein during traversal of the parking-space-exiting trajectory, in each case sensing of the surroundings takes place at least at end positions of the S-shaped sections in order to check whether the vehicle is in an intermediate position from which the parking space can be exited without a collision.

19. The method as claimed in claim 15, wherein the parking-space-exiting trajectory has a first straight section which forms a straight rearward maneuver and whose end position is adjoined by a first S-shaped section which moves the vehicle laterally in parallel in the parking space and forms a first forward maneuver.

20. The method as claimed in claim 15, further comprising, during the determination of the parking-space-exiting trajectory, simultaneously detecting whether traversal of an S-shaped section is possible.

21. The method as claimed in claim 15, wherein while the process of exiting the parking space is being carried out, the driver of the vehicle is responsible for accelerating and braking the vehicle and for monitoring the flowing traffic.

\* \* \* \* \*